United States Patent [19]

van der Wal et al.

[11] Patent Number: 5,152,970
[45] Date of Patent: Oct. 6, 1992

[54] PROCESS FOR THE REMOVAL OF HYDROGEN SULFIDE FROM GASES

[75] Inventors: Willem J. J. van der Wal, Leusden; Rinko B. Tjepkema; Gerard Heijkoop, both of Apeldoorn, all of Netherlands

[73] Assignee: VEG-Gasinstituut N.V., Wilmersdorf, Netherlands

[21] Appl. No.: 825,827

[22] Filed: Jan. 24, 1992

Related U.S. Application Data

[63] Continuation of Ser. No. 470,994, Jan. 22, 1990, abandoned, which is a continuation of Ser. No. 276,686, Nov. 28, 1988, abandoned.

[30] Foreign Application Priority Data

Nov. 28, 1987 [DE] Fed. Rep. of Germany ....... 3740439

[51] Int. Cl.$^5$ .................... C01B 17/16; C01B 17/027; B01D 53/36
[52] U.S. Cl. .................... 423/230; 423/231; 423/576.2; 423/576.8; 423/224
[58] Field of Search .................... 423/230, 231, 573.1, 423/576.1, 224, 576.2, 576.8; 502/34, 517

[56] References Cited

U.S. PATENT DOCUMENTS

| | | | |
|---|---|---|---|
| 3,890,120 | 6/1975 | Guyot et al. | 55/62 |
| 4,311,683 | 1/1982 | Hass et al. | 423/230 |
| 4,478,800 | 10/1984 | van der Wal et al. | 423/231 |
| 4,552,750 | 11/1985 | van der Wal et al. | 502/258 |

FOREIGN PATENT DOCUMENTS

| | | |
|---|---|---|
| 242920 | 10/1987 | European Pat. Off. . |
| 2530674 | 1/1976 | Fed. Rep. of Germany . |
| 2224196 | 10/1974 | France . |
| 0048585 | 4/1977 | Japan ................................. 502/517 |
| 0039286 | 4/1978 | Japan ................................. 502/517 |
| 0109448 | 8/1980 | Japan ................................. 502/517 |
| 1351786 | 5/1974 | United Kingdom . |
| 1504059 | 3/1978 | United Kingdom . |

OTHER PUBLICATIONS

Chemical Engineer Jan. 25, 1985 pp. 62–63.
Chemical Engineer Nov. 1984 pp. 30–34.
Hydrocarbon Processing May 1986 pp. 37–39.
Environmental Science & Technology vol. 10, No. 7, Jul. 1976 pp. 659–661.

*Primary Examiner*—Gary P. Straub
*Attorney, Agent, or Firm*—Schweitzer Cornman & Gross

[57] ABSTRACT

The invention relates to a process for the removal of hydrogen sulfide from gases by passing the gases in the presence of oxygen and steam over a catalytic absorption mass which contains inert porous support materials as support and catalytically active metal sulfides and/or metal oxides for the selective oxidation of hydrogen sulfide to elemental sulfur, the sulfur formed being simultaneously deposited on the absorption mass, and regenerating the charged catalytic absorption mass.

21 Claims, No Drawings

PROCESS FOR THE REMOVAL OF HYDROGEN SULFIDE FROM GASES

This is a continuing application of U.S. Ser. No. 470,994 filed on Jan. 22, 1990 now abandoned which was a continuation of U.S. Ser. No. 276,686, filed on Nov. 28, 1988, now abandoned.

FIELD AND BACKGROUND OF THE INVENTION

This invention relates to a process for the removal of hydrogen sulfide from gases by passing the gases in the presence of oxygen and steam over a catalytic absorption mass which contains inert porous support materials as support and catalytically active metal sulfides and/or metal oxides for the selective oxidation of hydrogen sulfide to elemental sulfur, the sulfur formed being simultaneously deposited on the absorption mass, and regenerating the charged catalytic absorption mass.

The removal of hydrogen sulfide from industrial gases, for example coal gas, has long been a problem. Before 1940, hydrogen sulfide was removed from coal gas by reaction with moist iron oxide at temperatures below about 100° C. When the uptake of sulfur had reduced the reactivity of the oxide, the absorption mass was regenerated by treatment with air. Through the reaction with oxygen, the iron sulfide formed was slowly converted into iron oxide and elemental sulfur.

In order to obtain a relatively high uptake of sulfur, a little oxygen was added to the coal gas. The iron oxide then acted as a catalyst which produced a reaction between the hydrogen sulfide and sulfur at low temperatures. The elemental sulfur formed remained in the iron oxide and reduced the catalytic activity. Because it was difficult to extract the sulfur deposited from the catalyst mass, the deactivated catalyst was generally discarded. The frequent renewal of the catalyst was of course a technical disadvantage.

On account of these disadvantages, the removal of hydrogen sulfide was carried out continuously by absorption in liquid phase. Hydrogen sulfide is absorbed in organic liquids, such as methanol or alkanolamines. Although this process has advantages over the process using iron oxide, it also has certain disadvantages.

A low-temperature desulfurization process is described in European patent application 98 444. In this process, a fluid absorption mass based on iron hydroxides contained in absorption towers is passed in countercurrent to the gas containing the hydrogen sulfide. However, the charged absorption mass loses it catalytic activity because the sulfur is deposited on the surface and the catalytic absorption mass cannot be regenerated in this process.

A similar low-temperature gas desulfurization process is described in The Chemical Engineer, November 1984, page 30. This process is used to remove hydrogen sulfide from natural gas from North Sea oil sources. In this process, hydrogen sulfide is removed by reaction with granular zinc oxide in fixed-bed reactors. However, the disadvantage of this process lies in the fact that the absorbing material cannot be regenerated and the fixed-bed reactors have a limited life before they have to be renewed.

In addition to dry processes for the removal of hydrogen sulfide, various processes have been developed for the wet-chemical oxidative removal of hydrogen sulfide. In the Linde Sulfolin process, which is described in Wissenschaft und Technik, Vol. 8, page 371, 1986, hydrogen sulfide is removed from the gas to be purified by absorption in an aqueous soda solution and is oxidized to sulfur by means of sodium vanadate.

In the LO-CAT process, which is described in Chemical Engineering, page 62, 1985, the hydrogen sulfide passed into an alkaline aqueous solution of $Fe^{3+}$ ions is directly oxidized to elemental sulfur. However, this wet-chemical process is attended by the disadvantages that the absorption solutions have only a very limited uptake capacity and have to be discarded after the process. Further disadvantages of this process include the expensive plant required, the high investment costs and the complicated operation of the plants.

An improved process for the removal of hydrogen sulfide is described in Hydrocarbon Processing, 1986, page 37. In this process, reaction vessels containing zinc oxide are used to absorb hydrogen sulfide and are regenerated by heating in an oxygen-containing air stream. Although regeneration of the absorption mass containing zinc oxide enables it to be reused, the sulfur dioxide formed in the process presents further disposal problems. Another disadvantage of this process is that, after several absorption cycles, the absorbable surface is reduced to 10% of the original surface.

DE-OS 21 44 567 describes the desulfurization of hydrocarbons with a desulfurization mass consisting of a porous support having a large specific surface to which divalent copper oxide is applied. This mass is produced by impregnation of the porous support material with an aqueous copper salt solution and drying. The mass obtained, even after calcination, contains the copper oxide in coarse granules, as is also the case with the other known reaction masses described above. Accordingly, desulfurization with this mass can only be carried out at relatively low temperatures because the mass sinters at relatively high temperatures. Regeneration is complicated and involves several process steps. The quantity of sulfur absorbed decreases greatly with increasing number of regeneration cycles (cf. Example 5 of DE-OS 21 44 567).

U.S. Pat. No. 4,478,800 (corresponding to EP-A-0 071 983) describes a process for the removal of hydrogen sulfide, carbonyl sulfide and/or carbon disulfide from gases which comprises the steps of:
 a) passing the gas containing hydrogen sulfide, carbonyl sulfide or carbon disulfide at a temperature of 5° to 800° C. over an absorption mass, including metal oxides, which react with the sulfur compound, metal-sulfur compounds being obtained and these metal oxides being present on an inert, refractory support material having a specific surface of more than 10 m² per g,
 b) charging the support material with the metal oxide in a quantity of at least 5% by weight, expressed as metal of the active component and based on the weight of the support material,
 c) at least 20% of the metal oxides on the support material being present in finely divided form with a particle size of less than 40 nm and
 d) regenerating the support material charged with metal-sulfur compounds by oxidation of these metal-sulfur compounds by passing over gases, including oxidizing agents.

This process gives excellent results. However, the quantity of sulfur with which the absorption mass can be charged is relatively low compared with the results of the present invention. Although, according to U.S.

Pat. No. 4,478,800, the removal of hydrogen sulfide and other sulfur compounds can be carried out at a temperature of 5° to 800° C., temperatures above 300° C. only are used in the Examples. In addition, the gases are preferably reducing gases, reducing gases being used in all the Examples.

A key feature of U.S. Pat. No. 4,478,800 is that the regeneration of the charged absorption mass is carried out by oxidation. Surprisingly, it was possible by regeneration of the absorbents in accordance with U.S. Pat. No. 4,478,800 directly to obtain elemental sulfur providing certain, active finely divided metal oxides, such as iron oxide, are used in the absorption mass.

Since there is a growing demand for improved processes for the removal of hydrogen sulfide from gases, it is an object of the present invention to provide a process which can be carried out at low temperatures and even at room temperature, hydrogen sulfide being removed substantially quantitatively from the gases, the same mass being capable of repeated regeneration and reuse for the removal of H₂S and elemental sulfur being directly obtained with no formation of sulfur oxides.

DESCRIPTION OF THE INVENTION

Surprisingly, these problems can be solved by the process according to the present invention.

Accordingly, the present invention relates to a process for the removal of hydrogen sulfide from gases by passing the gases in the presence of oxygen over a catalytic absorption mass, which contains inert porous support materials as support and catalytically active metal sulfides and/or metal oxides for the selective oxidation of hydrogen sulfide to elemental sulfur, and regenerating the charged catalytic absorption mass, characterized in that a) the temperature of the absorption mass during the selective oxidation and absorption step is below the melting point of elemental sulfur,
b) the gas contains at least 0.5% by volume water,
c) the quantity of active metal sulfides and/or metal oxides is at least 1% by weight, expressed as metal and based on the weight of the support material, at least 20% by weight of the sulfides being present on the support material in finely divided form with a particle size of less than 40 nm,
d) after charging with solid sulfur, the catalytic absorption mass is regenerated in the absence of oxygen by evaporation of the sulfur deposited thereon,
e) the catalytic absorption mass is rehydrated,
f) this removal, regeneration and rehydration cycle is repeated at least twice.

The abbreviation "nm" used in this specification stands of course for nanometers.

According to the invention, numerous compounds can be used as inert, refractory or heat-stable support materials providing they have a large specific surface. Such support materials preferably have a large pore volume so that a large quantity of solid sulfur can be deposited on the mass. It is possible to use products known from the prior art, such as aluminum oxide, silicon dioxide, silicon dioxide/aluminum oxide, silicon dioxide/magnesium oxide, zirconium dioxide, silicon dioxide/zirconium dioxide, titanium dioxide, silicon dioxide/zirconium dioxide/titanium dioxide, cystalline or amorphous aluminum silicate molecular sieves, metal phosphates and active carbon.

In the process according to the invention, the catalytic absorption mass contains metal sulfides and/or metal oxides as active constituents. As will be explained in detail hereinafter in the Production Examples, the metal sulfides may be prepared first by production of the catalytic absorption masses containing the corresponding metal oxides or hydrated oxides on the support materials by the known processes described, as mentioned above, in U.S. Pat. No. 4,478,800. Suitable metal oxides which may be deposited on the support material can be determined on the basis of known thermodynamic data. To this end, reference is made to P. R. Westmoreland and D. P. Harrison, Environmental Science and Technology, 10 (7) (1976), pages 659–661. Examples of suitable oxides are the oxides of chromium, cobalt, copper, iron, manganese, vanadium and molybdenum. When a catalytic absorption mass such as this is treated with a gas containing oxygen and hydrogen sulfide at temperatures below the melting point of sulfur, the metal oxides or hydrated oxides are converted to a large extent into the metal sulfides. When such a mass is introduced into the reactor in which the removal of hydrogen sulfide is to be carried out by the process according to the invention, the metal oxides or hydrated oxides are converted into the metal sulfides as defined above.

Two reactions can take place during the absorption process, namely:

$$H_2S + \tfrac{1}{2}O_2 \rightarrow S + H_2O \qquad (1)$$

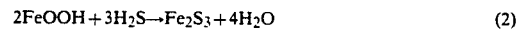

$$2FeOOH + 3H_2S \rightarrow Fe_2S_3 + 4H_2O \qquad (2)$$

The first reaction is the selective oxidation reaction to elemental sulfur while the second reaction is the reaction with iron oxide.

This fact enables the process according to the invention to be started with an absorption mass containing inert porous support materials as support and metal oxides or hydrated oxides instead of the catalytically active metal sulfides, so that when such a mass is used for the first time in the reactor for the process according to the invention, the metal oxides or hydrated oxides are converted into the catalytically active metal sulfides at the outset. A small quantity of H₂S can escape at this stage and is present in the exit gas. Thereafter the removal of hydrogen sulfide from the gases can be carried out as defined above. Through a process such as this, the active catalytic absorption masses containing the metal sulfides as active material as defined above can be prepared in situ from the oxides or hydrated oxides at the beginning of the hydrogen sulfide removal stage.

The sulfidizing reaction of the metal oxide can lead to complete substitution of the oxygen atoms attached to the metal atoms by sulfur atoms. However, complete substitution is not necessary because even corresponding partial substitution gives an absorption mass of high catalytic activity. During this first sulfidizing step and in the further course of the removal of hydrogen sulfide, the gas introduced must contain water vapor.

Catalytic absorption masses containing the metal sulfides as active constituents must of course be prepared separately therefrom and introduced into the reactor for the removal of hydrogen sulfide.

The selective oxidation of H₂S to sulfur by the process according to the invention takes place even at very low temperatures. As shown above, the selective oxidation and absorption must be carried out below the melting point of elemental sulfur, so that the active metal sulfides and the pores of the support material are not blocked by liquid sulfur. Liquid sulfur very quickly blocks the pores of the absorption mass and, under such conditions, only a very small quantity of sulfur could be deposited thereon before regeneration was necessary.

The temperature of the absorption mass is preferably below 120° C., more preferably below 90° C. and most preferably below 70° C. to avoid the danger of such deactivation and to prevent elemental sulfur being removed with the exit gas and having to be removed therefrom. This makes the industrial process easier. It is usually sufficient to carry out the process without external heating, the temperature of the absorption mass being below 50° C. Because the reaction is exothermic, the temperature of the absorption mass depends on the entry temperature and the concentration of hydrogen sulfide in the gas. Each additional percent of hydrogen sulfide will produce an increase in temperature of up to about 50° C. To keep the temperature of the catalytic absorption mass below the melting point of the elemental sulfur, cooling may be necessary. However, since the gas contains a small quantity of water vapor, the temperature should be above the freezing point of water. In one particular embodiment of the process, the selective oxidation of the hydrogen sulfide by oxygen is carried out with an atomic ratio of oxygen to sulfur which exceeds a value of 1, the hydrogen sulfide or the sulfur formed not being oxidized to sulfur dioxide.

If the atomic ratio of oxygen to sulfur of the hydrogen sulfide to be oxidized is below 1, a small quantity of hydrogen sulfide can escape and can be present in the exit gas. To avoid this and on account of possible variations in the supply of $H_2S$ and oxygen, it is preferred that the atomic ratio of oxygen to sulfur rise above 1.1 or even 1.2. The upper limit to the excess of oxygen is not crucially important to the process according to the invention, although to save energy the excess should be as small as possible because a large excess is of no advantage. The oxygen may advantageously be added by feeding air into the gas from which the hydrogen sulfide is to be selectively removed by oxidation.

Although it is pointed out in U.S. Pat. No. 4,478,800, in connection with a particular embodiment, that care must be taken to ensure that the quantity of oxygen or oxidizing agent is not larger than necessary for formation of the sulfur from the metal oxides of the absorption mass, there is surprisingly no danger in using relatively large quantities of sulfur in the process according to the invention. The reason for this lies presumably in the fact that the temperature during the selective oxidation reaction of $H_2S$ to sulfur is below the melting point of elemental sulfur, so that the secondary reactions

$$H_2S + 1\tfrac{1}{2}O_2 \rightarrow SO_2 + H_2O \quad (3)$$

$$S + O_2 \rightarrow SO_2 \quad (4)$$

or the oxidation to sulfur trioxide do not take place under the reaction conditions according to the invention.

It is surprising that the highly active catalytic absorption mass used in the process according to the invention in no case catalyzes oxidation of the sulfur to sulfur dioxide during the process providing the process is carried out as described herein.

According to the invention, the gas should contain at least 0.5% by volume water. The upper limit is not particularly crucial, although the quantity of water vapor should not be above the saturation limit of the gas with water vapor at each point of the absorption vessel and is preferably below the saturation limit on account of the capillary condensation. According to the invention, the gas can be fed into the absorption vessel at very low temperatures, preferably at ambient temperature, for example a couple of degrees above 0° C. in winter. The temperature of the gas in the reactor rises during the absorption process because the oxidation reaction between $H_2S$ and oxygen is highly exothermic. When the heat of reaction is intense on account of a high $H_2S$ content in the gas introduced, the absorption mass has to be cooled so that the temperature of the absorption mass does not rise beyond 120° C. If the entry temperature of the gas introduced is relatively high, the quantity of water may be larger. It is preferred—providing the entry temperature is high enough—that the gas contain at least 2% by volume water. However, the water content should be as low as possible, preferably below 10% by volume, not only to rule out the condensation of water in the vessel, but also to satisfy economic requirements in regard to the gas property.

If the gas from which hydrogen sulfide is to be removed does not contain any water vapor, it is nevertheless possible at the outset effectively to remove hydrogen sulfide. However, a serious, sudden breakthrough of hydrogen sulfide occurs after a relatively short time (in some cases about 30 to 40 minutes). If thereafter water is added to the feed gas in the quantities defined above, the proportion of hydrogen sulfide in the exit gas falls after a certain time until hydrogen sulfide ultimately breaks through after the absorption mass has been completely charged. However, if water is present in the feed gas in accordance with the invention, the removal of hydrogen sulfide may be carried out over a longer period and the catalytic absorption mass may be charged with large quantities of sulfur.

It is very surprising that the presence of water vapor in the gas has such a favorable effect on the process according to the invention. Presumably the water vapor continuously rehydrates the catalytic absorption mass and thus protects it against deactivation.

The catalytic absorption mass used in the process according to the invention may be produced by the method used in U.S. Pat. No. 4,478,800. As already mentioned, however, metal sulfides are the active material which can be formed before the actual step of removal of the hydrogen sulfide. There is no need to charge the support material with such active metal sulfides (or initially metal oxides) in a quantity of at least 5% by weight, expressed as metal of the active component and based on the weight of the support material. The lower limit should be at least 1% by weight, preferably at least 5% by weight and more preferably at least 10% by weight. It is essential that the support material should have a large pore volume and surface and should act like a sponge for the sulfur which is to be deposited on the catalytic absorption mass during the removal reaction. The upper limit to the quantity of active metal is preferably at 30% by weight and more preferably 20% by weight. Since, in contrast to the process according to U.S. Pat. No. 4,478,800, the catalytic absorption mass does not act by chemical bonding of the hydrogen sulfide, but by the physical deposition of elemental sulfur which has been formed, a high content of active material is not necessary.

The most preferred active metal is iron, partly because it is very inexpensive and shows high activity in the process according to the invention. However, examples of other suitable metals are chromium, cobalt, molybdenum, copper, manganese and vanadium and, more particularly, mixed metal sulfides of iron with one or more such metals.

The catalytic absorption masses used in the process according to the invention have the particular advantage over the known, commonly used industrial processes for the physical and chemical absorption of hydrogen sulfide in solvents that they can remove hydrogen sulfide from gases to very small residual concentrations, these gases containing varying quantities of hydrogen sulfide. In addition, the process according to the invention is economical in terms of operating and investment costs, particularly for gases containing small quantities of hydrogen sulfide.

In the regeneration of the charged absorption mass, the elemental sulfur is merely evaporated and directly obtained in one step whereas, in the prior art, hydrogen sulfide has to be driven out from the liquid absorbent and has to be additionally processed into sulfur by another known process. Absorption with liquid absorbents requires both elaborate and expensive plant; absorption towers 15 to 25 m in height are required. In addition, an elaborate and expensive plant has to be constructed and operated for the recovery of sulfur from the hydrogen sulfide. By contrast, a relatively small absorption reactor is sufficient for the process according to the invention.

At least 50% by weight of the metal sulfides are present on the support material with the above-defined particle size of less than 40 nm and more preferably less than 20 nm.

The above-mentioned quantity is present in particular in a particle size below 15 nm and, more preferably, below 10 nm because, in this case, catalytic activity is very high. The lower limit to the particle size is not particularly important, being at around 1 nm and preferably at 3 nm. The process according to the invention may also be used with advantage inter alia for the removal of sulfur compounds from natural gases. In this case, removal is carried out until the catalytic absorption mass is charged with solid elemental sulfur. By "charged" is meant that at least some elemental sulfur has been formed. As can be seen from the Examples, the breakthrough of hydrogen sulfide occurs rather early when a catalytic absorption mass is used for the first time in an absorption step, the so-called pre-sulfidizing step, whereas in a second cycle of further absorption and regeneration cycles breakthrough occurs very much later. For economic reasons, the charging with elemental sulfur should of course be as high as possible to increase the absorption time. Generally speaking, the mass should be charged with such a quantity of elemental sulfur that the total quantity of absorbed hydrogen sulfide, expressed as the molar ratio of hydrogen sulfide to metal, is more than 1 and preferably more than 2. In further cycles, it is possible to charge the mass until the molar ratio of sulfur to metal is above 10 or higher, as can be seen from the Examples.

After the selective oxidation and simultaneous absorption, the catalytic absorption mass is charged with an acceptable and adequate quantity (from the commercial and technological standpoint) of solid elemental sulfur and is regenerated by evaporation of the sulfur deposited thereon. It is a key feature of the present invention that this evaporation of sulfur is carried out in the absence of oxygen or other oxidizing agents which, under the regeneration conditions, would lead to the formation of sulfur oxides, particularly $SO_2$ or $SO_3$. The evaporation temperature is so high that the sulfur evaporates and is carried away by a gas stream. Very high temperatures should be avoided because they have no commercial value. For practical reasons, the minimum evaporation temperature should be so high that the gas stream has a temperature of at least 240° C., preferably of at least 275° C. and more preferably of at least 300° C. As mentioned above, the upper limit is imposed by commercial considerations: in general, the temperature should not be above 350° C. Generally speaking, the temperature of the gas stream by which the sulfur evaporated is carried away should be high enough for the sulfur to be evaporated and rapidly carried away. On the other hand, if the temperature of the gas stream is too low, polymeric forms of elemental sulfur can be formed, as known to the expert. In addition, at extremely high temperatures, there is a danger of sulfates being undesirably formed by reaction with water.

If the process temperature during regeneration is higher than 150° C., as defined above, and if the vapor pressure of the sulfur is high enough for the Claus equilibrium to be kinetically established, hydrogen sulfide is in danger of being formed again by the reaction of sulfur with steam in accordance with the following equation:

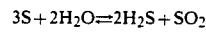

$$3S + 2H_2O \rightleftharpoons 2H_2S + SO_2$$

For this reason, the partial pressure of water during regeneration should be very low. For this reason, one preferred embodiment of the invention is characterized in that, during the regeneration step d), an inert gas stream is first passed over the absorption mass at temperatures below the melting point of elemental sulfur to remove the water, after which the temperature is increased to temperatures at which the sulfur evaporates. This embodiment is particularly recommendable because the catalytic absorption mass can contain considerable quantities of water during the absorption process. The drying step is continued until the exit gas stream is substantially free from water. After the entire quantity or substantially the entire quantity of elemental sulfur with which the catalytic absorption mass is charged has been evaporated off, the catalytic absorption mass is rehydrated with an inert gas stream preferably containing at least 0.5% by volume water. Rehydration should be carried out because the water content of the absorption mass has decreased on account of the elevated temperatures during evaporation of the sulfur and, after rehydration, the absorption mass shows considerably higher activity for the selective oxidation of $H_2S$ to sulfur.

If catalysts which are not Claus-active are used in the process according to the invention, water vapor may also be present in the gas during the regeneration step. After evaporation of the sulfur, the absorption mass has to be rehydrated again. The rehydration is preferably carried out in an inert gas, such as nitrogen or carbon dioxide or hydrocarbons. An inert gas such as this may also be used during evaporation of the sulfur. The gas stream for rehydration preferably contains at least 0.5% by volume and more preferably at least 2% by volume of water. The upper limit is fundamental as in the above-described removal of hydrogen sulfide, the gas stream preferably containing at most 20% by volume water.

The temperatures prevailing during rehydration are substantially the same as those prevailing during the removal of hydrogen sulfide. The temperature of the absorption mass is preferably below 80° C. during the treatment with the inert gas stream containing the water vapor.

One particular advantage of the present invention is that the removal and regeneration cycle can be repeated many times, for example more than 50 times. After several removal and regeneration cycles, the catalytic absorption mass may become less active and should be replaced by a new mass.

The process according to the invention is preferably used for gases containing small quantities of hydrogen sulfide. The hydrogen sulfide is removed almost completely to the breakthrough point. Hydrogen sulfide concentrations of less 1 ppm in the exit gas can be achieved very easily. The ppm values mentioned in the following Examples are based on the volume of the gases.

EXAMPLE 1

A cylindrical reactor 1.5 cm in diameter was filled with 10.2 ml of a catalytic absorption mass produced in accordance with Production Example 1 of U.S. Pat. No. 4,478,800. This mass contained 0.5 g aqueous iron oxide. A gas mixture containing 2000 ppm $H_2S$, 2000 ppm oxygen, 2% water and, for the rest, nitrogen, was passed over the mass at room temperature at a spatial velocity of 5000 hour$^{-1}$ (850 ml/minute). The $H_2S$ content of the gas issuing from the reactor was lower than 1 ppm. After 2.5 hours, the concentration of $H_2S$ in the exit gas of the reactor began to increase slowly, reaching approximately 70 ppm after 3.5 hours. At the beginning of the desulfurization process, the oxygen concentration of the exit gas was approximately 1000 ppm. During the process, the concentration of oxygen in the exit gas increased slowly to around 1400 ppm.

The consumption of oxygen during the desulfurization process shows that part of the $H_2S$ is directly converted into elemental sulfur. When the concentration of $H_2S$ in the exit gas had risen to approximately 200 ppm, the absorption process was terminated. The quantity of $H_2S$ absorbed, expressed as the molar ratio of $H_2S$ to iron, was 2.8, corresponding to a charge of approximately 10% by weight elemental sulfur on the catalytic absorption mass.

After the breakthrough of $H_2S$, the absorbent is regenerated by removal of the elemental sulfur from the surface of the absorber. The regeneration process comprises the following steps:
1. drying of the absorbent at 100° C. with nitrogen,
2. evaporating the elemental sulfur at 300° C. with nitrogen,
3. rehydrating the absorbent at 50° C. in a stream of nitrogen gas containing 2% water.

During the regeneration step, the elemental sulfur which had been deposited on the surface was obtained as elemental sulfur. No $SO_2$ was found. This test is an example of the pre-sulfidizing step.

EXAMPLE 2

The absorption mass of Example 1 was used for a second desulfurization cycle. The reaction conditions were the same as described in Example 1. No $H_2S$ was detected in the reactor exit gas for 20 hours. During the selective oxidation and the absorption cycle, the oxygen concentration in the gas was around 1000 ppm, indicating that 50% of the oxygen had been used for the conversion of $H_2S$ into elemental sulfur. During the cycle, 100% of the $H_2S$ was converted into elemental sulfur, corresponding to the direct oxidation reaction. After 20 hours, $H_2S$ was detected in the reactor exit gas. For a breakthrough of 200 ppm $H_2S$, the molar ratio of $H_2S$ to iron was 19.5, corresponding to a charge of approximately 70% by weight sulfur.

The regeneration step was carried out in the same way as described in Example 1. No $SO_2$ was detected in the exit gas of the reactor during regeneration. The entire quantity of sulfur deposited on the surface of the absorbent was recovered as elemental sulfur.

EXAMPLE 3

This experiment describes the desulfurization of a catalytic absorption mass produced in accordance with Production Example 2 of U.S. Pat. No. 4,478,800. The quantity of catalytic absorption mass and the desulfurization conditions were the same as in Example 1. After about 2 hours, $H_2S$ was detected in the exit gas of the reactor. The concentration profile of oxygen during desulfurization was comparable with that of Example 1. The sulfur charge during desulfurization amounted to approximately 8% by weight, corresponding to a molar ratio of $H_2S$ to Fe of 2.23. Regeneration of the catalytic absorption mass was carried out in the same way as described in the previous Examples. No $SO_2$ was detected in the exit gas of the reactor during regeneration. This is another example of the presulfidizing step.

EXAMPLE 4

This Example describes the second desulfurization cycle of the absorbent which was described in Example 3. The experiment was carried out in the same way as described in Example 2. After 15 hours, $H_2S$ was detected in the exit gas of the reactor. At this time, the concentration of the oxygen in the exit gas of the reactor began to increase slowly. The increase in the oxygen concentration coincided with the increase in the $H_2S$ concentration. After the breakthrough of 200 ppm $H_2S$, the molar ratio of $H_2S$ to Fe was 21, corresponding to a charge of 75% by weight elemental sulfur on the catalytic absorption mass. Regeneration was carried out in the same way as described in the previous Examples. No $SO_2$ was detected in the exit gas during regeneration.

EXAMPLE 5

This Example describes the fourth desulfurization cycle of the absorbent described in Examples 3 and 4. The quantity of the absorbent amounted to 10.2 ml (5 g). The reaction gas consisted of 2000 ppm $H_2S$, 2000 ppm oxygen, 2% water and, for the rest, nitrogen. The spatial velocity during the selective oxidation and absorption was 2500 hour$^{-1}$ (gas flow 425 ml/minute). Over a period of 60 hours, no $H_2S$ was detected in the exit gas of the reactor and 50% of the oxygen in the feed gas was consumed, indicating that the total quantity of $H_2S$ had been converted into elemental sulfur in accordance with the above-mentioned reaction. After 60 hours, the concentration of $H_2S$ increased rapidly. For an $H_2S$ breakthrough of 200 ppm, the molar ratio of $H_2S$ to Fe was 22.3, corresponding to a sulfur charge of more than 80%. Regeneration was carried out in the same way as in the preceding Examples. No $SO_2$ was detected during regeneration.

We claim:

1. A process for removing hydrogen sulfide, which comprises removing hydrogen sulfide from a gas containing hydrogen sulfide and from 0.5% by volume to under the saturation limit of gas of of water as steam, by (a) passing the gas in the presence of oxygen over an acceptor containing at least 1% by weight expressed as metal, of one or more active metal sulfides for the selective oxidation of hydrogen sulfide to elemental sulfur on an inert porous support, the concentration of the acceptor being based on the weight of said support, wherein at least 20% by weight of sulfide present is in finely divided form with a particle size of less than 40 nm, while maintaining the temperature of the acceptor below the melting point of elemental sulfur, and subjecting the spent acceptor to a regeneration cycle, wherein the regeneration is carried out by (b) removing water from the acceptor, and then evaporating the sulfur from the spent acceptor in the absence of oxygen or other oxidizing agents which would result in the formation of sulfur oxides, and (c) rehydrating the regenerated acceptor prior to reuse in step a and repeating (a), (b), and (c) at least twice.

2. A process for removing hydrogen sulfide, which comprises removing the hydrogen sulfide from a feed gas containing hydrogen sulfide and from 0.5% by volume to under the saturation limit of the gas of water as steam, by (a) passing the gas in the presence of oxygen over an acceptor containing an active ingredient which is one or more active metal sulfides for the selective oxidation of hydrogen sulfide to elemental sulfur, said active ingredient being disposed on an inert porous support, while maintaining the temperature of the acceptor below the melting of elemental sulfur, and subjecting the spent acceptor to a regeneration cycle, the regeneration is carried out by (b) removing water from the acceptor, and then evaporating the sulfur from the spent acceptor in the absence of oxygen or other oxidizing agents which would result in the formation of sulfur oxides, and (c) rehydrating the regenerated acceptor, prior to reuse in step a and repeating (a), (b), and (c) at least twice.

3. The process of claim 2, wherein the active ingredient is iron sulfide, or chromium sulfide.

4. The process of claim 2, wherein the atomic ratio of oxygen to sulfur in the feed gas is over 1.0.

5. The process of claim 4, wherein said atomic ratio is over 1.2.

6. The process of claim 2, wherein during the removal of hydrogen sulfide from feed gas the temperature of the acceptor is below 80° C.

7. The process of claim 6, wherein during the removal of hydrogen sulfide from feed gas the temperature of the acceptor is below 50° C.

8. The process of claim 2, wherein the acceptor is cooled during the removal of hydrogen sulfide from the feed gas.

9. The process of claim 2, wherein the feed gas contains from about 2% by volume to below the saturation limit of the feed gas of water, but not more than 10% by volume.

10. The process of claim 2, wherein the acceptor contains at least 5% by weight of one or more active metal sulfides.

11. The process of claim 2, wherein the acceptor contains a maximum of 30% by weight of one or more active metal sulfides.

12. The improvement of claim 2, wherein said step (b) comprises passing a gas stream over the acceptor at a temperature below the melting point of elemental sulfur to remove water, and then increasing the temperature to evaporate the sulfur.

13. The improvement of claim 12 wherein the temperature of step (b) during the evaporation of the sulfur is above 300° C.

14. The improvement of claim 2, wherein the temperature of step (b) during the evaporation of the sulfur is above 240° C.

15. The improvement of claim 2, wherein the temperature of step (b) during the evaporation of the sulfur is above 300° C.

16. The improvement of claim 2, wherein the temperature of step (b) during the evaporation of the sulfur is above 350° C.

17. The improvement of claim 2, wherein said step (c) is carried out by contacting the acceptor with a gas stream containing at least 0.5% by volume $H_2O$.

18. The improvement of claim 2 wherein said step (c) is carried out with a gas stream containing at least 2% by volume $H_2O$.

19. The improvement of claim 18, wherein the maximum $H_2O$ content of said gas stream is 20%.

20. The improvement of claim 2, wherein in step (c) the temperature of the acceptor is below 80° C.

21. The process of claim 2, wherein the sulfide or sulfides in the acceptor has a particle size of from about 1 nm to about 20 nm.

* * * * *